July 29, 1924.
C. E. WADE
METAL WHEEL
Filed Oct. 7, 1921  3 Sheets-Sheet 1
1,502,759
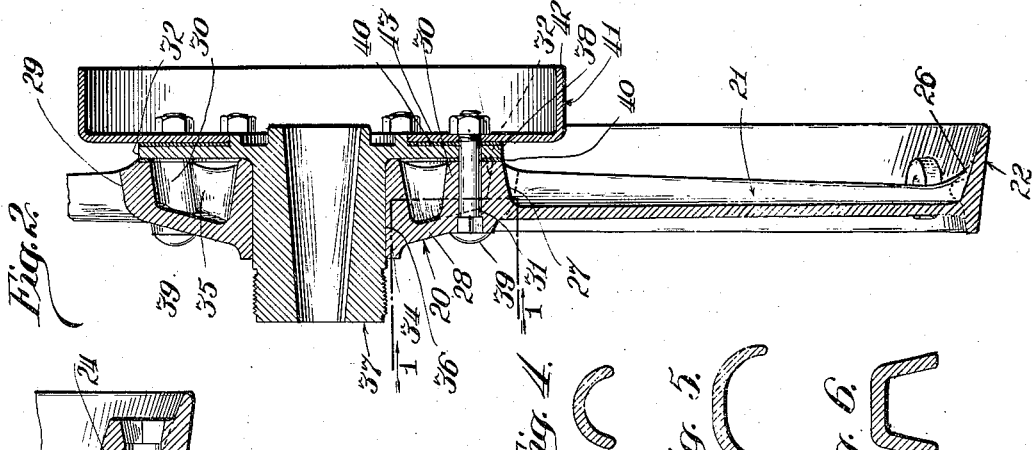
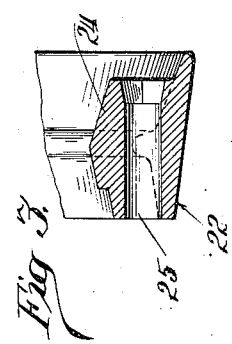
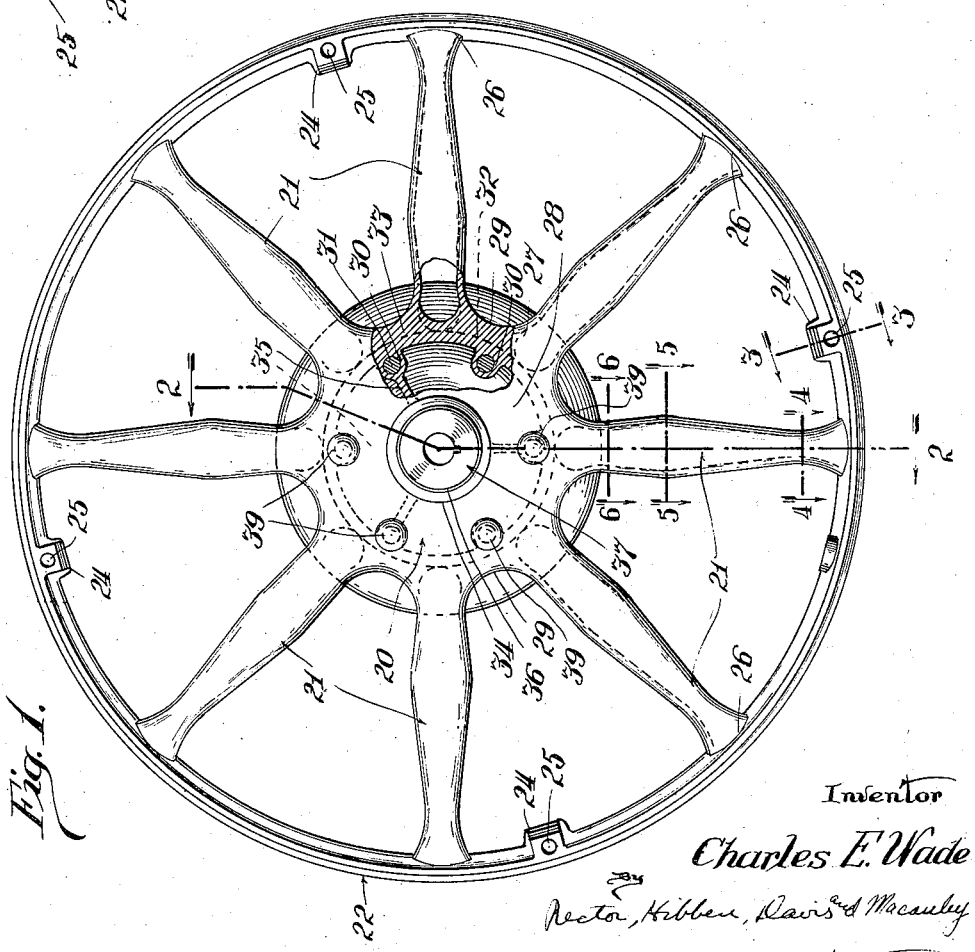
Inventor
Charles E. Wade
By Rector, Hibben, Davis & Macauley
Attorneys July 29, 1924.
C. E. WADE
METAL WHEEL
Filed Oct. 7, 1921    3 Sheets-Sheet 2
1,502,759
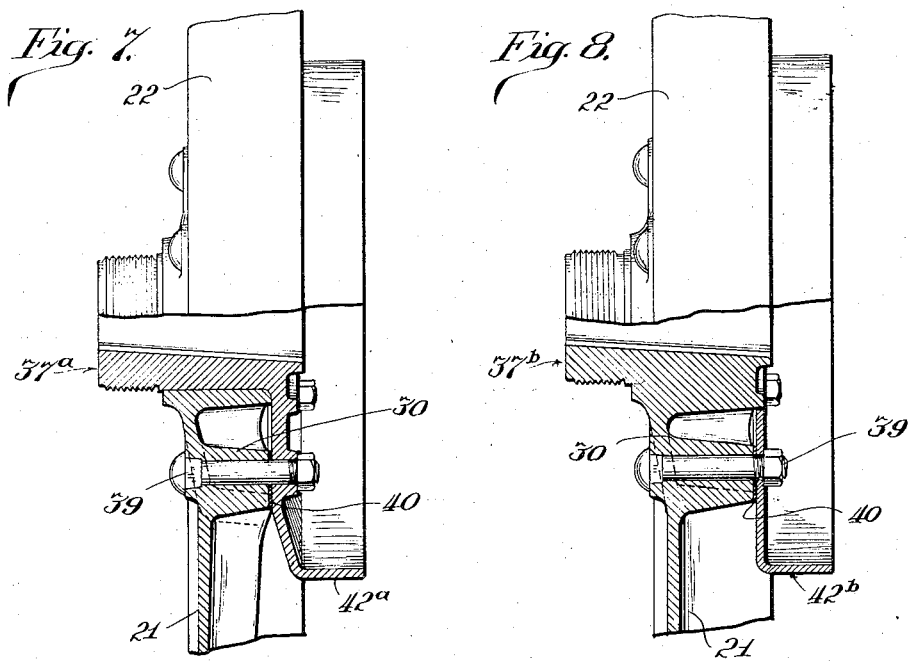
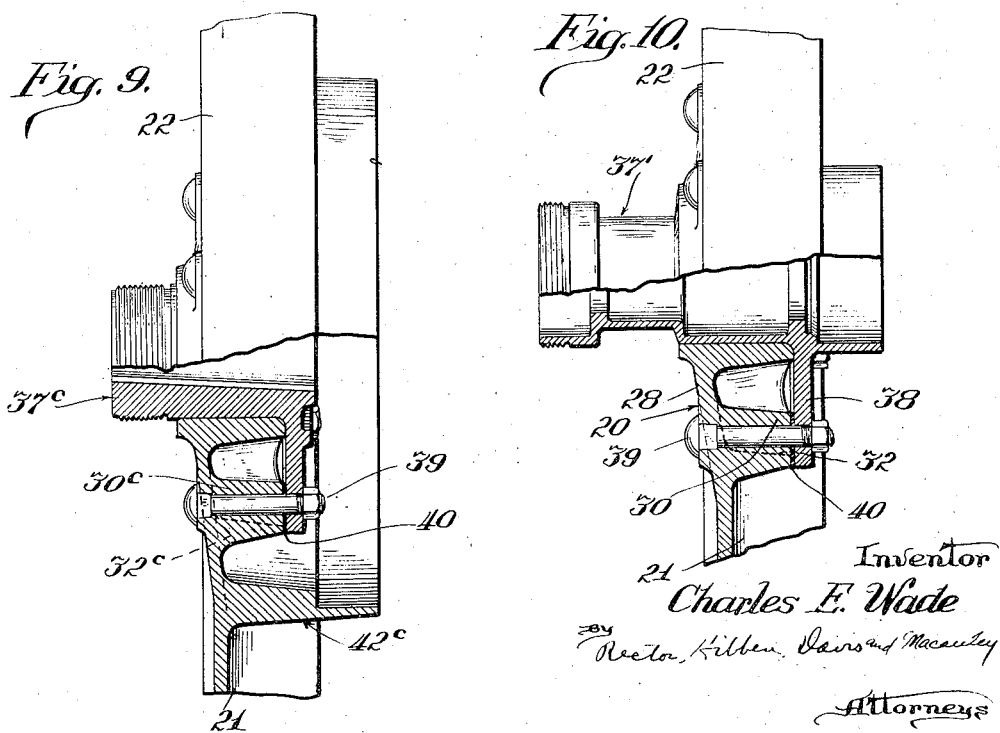

July 29, 1924.
C. E. WADE
METAL WHEEL
Filed Oct. 7, 1921    3 Sheets-Sheet 3
1,502,759
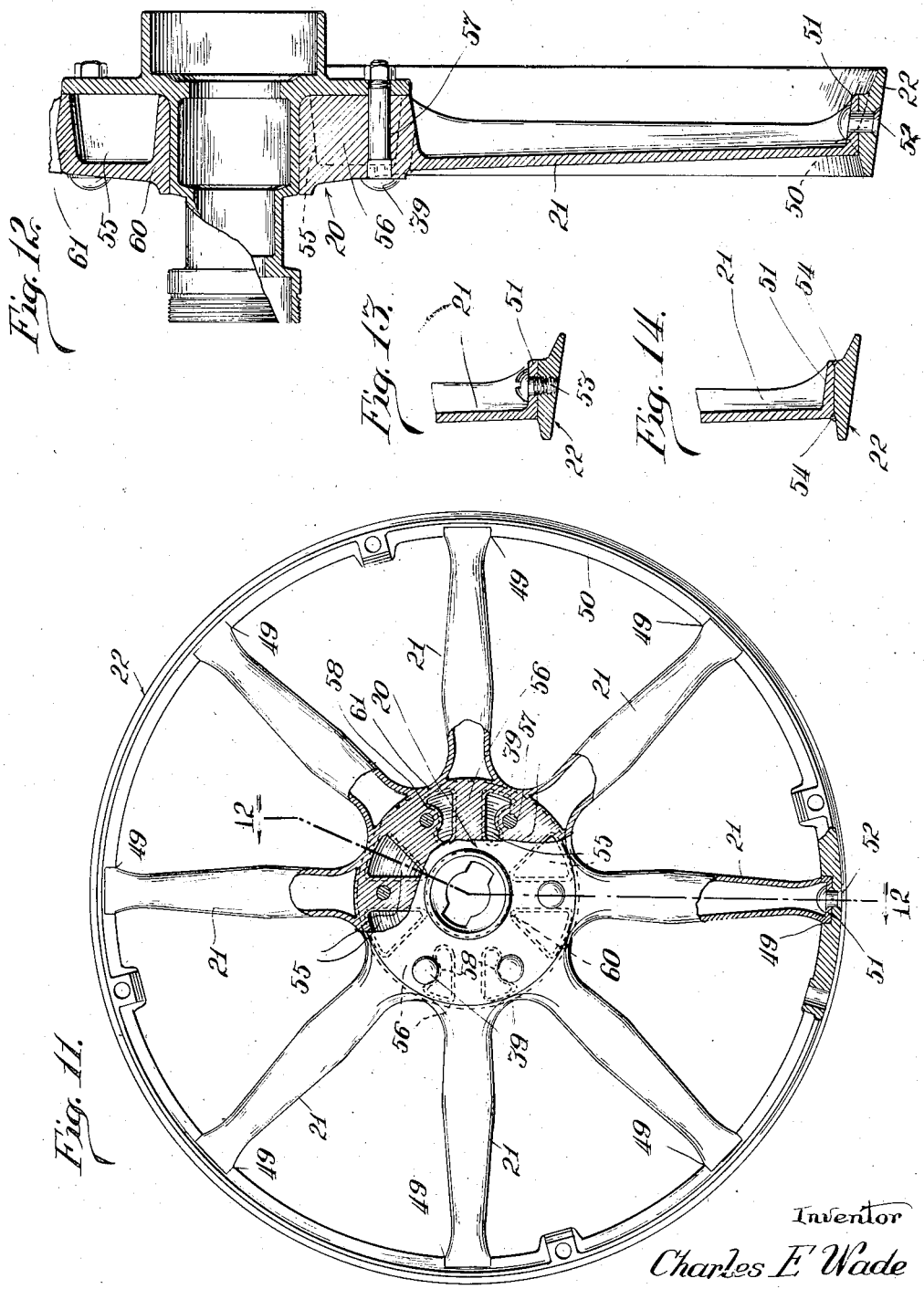

Patented July 29, 1924.

1,502,759

UNITED STATES PATENT OFFICE.

CHARLES E. WADE, OF DETROIT, MICHIGAN, ASSIGNOR TO JEFFERSON FORGE PRODUCTS COMPANY, OF DETROIT, MICHIGAN, A CORPORATION OF MICHIGAN.

METAL WHEEL.

Application filed October 7, 1921. Serial No. 506,032.

*To all whom it may concern:*

Be it known that I, CHARLES E. WADE, a citizen of the United States, residing at Detroit, in the county of Wayne and State of Michigan, have invented certain new and useful Improvements in Metal Wheels, of which the following is a specification.

My invention relates to metal wheels and has for its general object to provide a wheel suitable for use on vehicles and adapted to be made principally of a forging or forgings. On of the particular objects of my invention is to provide a construction wherein a forged unit of wheel structure may be provided accommodating the reception of parts separately made, to permit of utilization of a single main forging in meeting the specification-requirements of different makes of automobiles and other vehicles.

In the drawings, Fig. 1 is a side elevation with fragments broken away to a plane indicated by line 1—1 of Fig. 2, showing a wheel structure embodying my invention; Fig. 2 is a section on line 2—2 of Fig. 1; Fig. 3 is a section on line 3—3 of Fig. 1; Figs. 4, 5 and 6 are spoke sections on lines 4—4, 5—5 and 6—6, respectively, of Fig. 1; Fig. 7 is a fragmentary section generally similar to Fig. 2, showing a modified embodiment of my invention; Fig. 8 is a similar view showing another modification; Fig. 9 is a similar view showing a different modification; Fig. 10 is a similar view showing a different modification; Fig. 11 is a side elevation, generally similar to Fig. 1, showing another modification; Fig. 12 is a section on the line 12—12 of Fig. 11; and Figs. 13 and 14 are fragmentary sections, showing different modified means for securing the spokes to the felloe.

Throughout the drawings like numerals of reference refer to like parts.

In the construction shown in Figs. 1 and 2, the wheel comprises in an integral forging a center-body 20 from which spring radial spokes 21 the roots of which merge into the center body and the tips of which are suitably united to a felloe 22, that preferably is forged integrally therewith and that preferably has, integrally forged thereon at suitable intervals, lugs 24 to receive, in apertures 25 made therein, the retaining bolts for a rim-structure, not shown.

The spokes 21 are preferably arranged in a slightly dished formation and may be thin-walled but of channeled or parti-tubular section and "swelled" contour, with their tips spreading somewhat to merge into the felloe as indicated at 26. On account of their channel shape the depth (i. e., over-all dimension transversely to the plane of the wheel) of each spoke at its root 27 is much greater than the thickness of the relatively thin dished disk 28 that forms part of the center-body. I prefer that the roots of the spokes, thus inwardly overhanging, as it were, the disk portion 28, be joined or merged by connecting webs or metal bodies 29 that will extend substantially to what I may term the innermost plane of the center-body.

Inwardly projecting from the dished disk are a suitable series of strengthening-posts 30 terminating in the inner plane of the center-body, each apertured as at 31 for bolt-reception and preferably all united by and forming bulges or extensions from an annular flange-portion 32, of rather small diameter, combining low weight and great strength, that preferably also extends to the innermost plane of the center-body, greatly stiffening the structure and affording a foundation for attachment of parts for completion of the wheel assembly. The posts 30 are preferably positioned in a circle of somewhat smaller radius than that which will touch the bottoms of the interspoke spaces and since the flange formation 32 and the webs 29 rather closely approach they may be merged or united as at 33.

At its radially-inner perimeter the dished disk 28 merges into a deep collar 34 one end face of which preferably also lies substantially to the inner plane of the center-body and the depth of which is great enough to afford substantial bearing for its intended purpose. The radially-outer perimeter of the collar is preferably spaced from said flange 32, and at intervals webs 35, preferably radial, traverse the intervening space, the webs shown merging into the posts 30 and the collar 34.

The collar 34 may have a center opening 36 of just sufficient size to be readily machined to receive a standard wheel-hub 37 of some given make of vehicle, and the attaching flange 38 of said hub may extend to and overlie the posts 30 in substantially the inner plane of the center-body, and be secured thereto by bolts 39, passing through the openings 30. In the construction shown in Fig. 10 a "Ford" hub 37' is shown, so attached, making a front wheel structure suitable for the Ford automobile. It is my preference, where the metal surfaces of bolted-together parts meet flush or in a plane, to interpose thin shims 40 of fiber or the like between the adjoining surfaces to prevent noise and to take up slight irregularities in the confronting surfaces.

As shown in Fig. 2 a brake drum 41, having a brake-receptive rim 42 that may be of standard dimensions, may also be secured upon the bolts 39, this brake drum being a sheet-metal cup with its annular bottom 43 resting flat against the inner surface of the hub and completing an assembly suitable for a rear wheel of an automobile.

As shown in Fig. 7 a forging combining a suitable hub structure 37$^a$ and a brake drum 42$^a$ may be secured to the bolts 39, or, as shown in Fig. 8, a brake drum 42$^b$ alone may be secured to the bolts 39 and the hub 37$^b$ forged in an integral piece with the collar portion of the structure. In Fig. 9 a hub 37$^c$ alone is shown attached to the bolts 39, and a brake drum 42$^c$, is forged integrally with the spoke structures as a strengthening flange concentric with and surrounding the area that provides the posts 30$^c$ and their connecting annular flange 32$^c$.

In Figs. 11 and 12 I have disclosed a wheel in which the felloe 22 is formed, preferably forged, separately from the integral forged unit comprising the central body portion 20 and the spokes 21. An annular rib or bead 50 on the interior periphery of the felloe 22 is recessed at uniform or regular intervals, as indicated at 49, to accommodate the outer ends of the spokes which are provided with integral webs 51 closing or spanning their channels. The spokes, except for the webs 51, and the rim, except for the recesses 49, are substantially the same as those already described in detail. The webs 51 are preferably secured to the felloe by means of rivets 52 extending through aligned apertures in the webs and felloe, the outer ends of the apertures in the felloe being countersunk to accommodate the flattened ends of the rivets. Instead of employing rivets to fasten the spokes to the felloe, screws 53, as shown in Fig. 13, may be used, the screws, which project through the apertures in the webs 51, being screwed into the screw-threaded apertures in the felloe. If desired the outer ends of the spokes may be attached to the felloe by a suitable welding operation, as indicated by the welds 54 in Fig. 14, the use of screws or rivets then being eliminated.

The center-body 20 of the wheel, shown in Figs. 11 and 12, is constructed somewhat differently than that of the wheel shown in Figs. 1 and 2, but it is obvious that the wheel shown in Figs. 11 and 12 is adapted for use in connection with any of the forms of hubs and brake-drums shown in the various figures, it being illustrated as assembled on a "Ford" hub also shown in Fig. 10. The center-body of the wheel, disclosed in these Figs. 11 and 12, may be said to be of substantially uniform thickness (transversely of the plane of the wheel), recesses or depressions 55 of triangular contour being provided therein to form comparatively wide radiating ribs or posts 56 apertured at 57 for the reception of the bolts 39. Described in other words, the center-body is provided with an inner flange 60 and an outer concentric flange 61 with which the roots of the spokes merge and the radiating ribs or posts 56 extend integrally and inwardly from the disc portion of the center-body and merge at their ends in the flanges 60 and 61. Four of the depressions 55 are of rather irregular triangular shape, bulges or extension 58 on certain of the ribs or posts 56 being provided to project into the depressions for the purpose of accommodating or affording equal or regular spacing of the apertures 57.

It will be observed that the constructions described provide advantageously and effectively for the unitary forging of the spokes and a center-body that is provided with an integral inwardly extending series of connecting posts or ribs and a post-uniting flange, whereby the center structure of the wheel is effectively made of light construction, yet well strengthened and conveniently adapted for the reception of detachable parts that will adapt the major forgings for use in front-wheel and in rear-wheel assemblies for different makes of vehicles.

The light, strong forged structure thus provided compares favorably with wooden wheels in lightness while far excelling them in strength, and lends itself to artistic design without sacrifice of the qualities of adaptability and of economy in quantity manufacture that result from the advantageous constructions described.

I do not broadly claim a forged or unitary structure comprising a center-body, spokes and felloe, but rather the improvements on such heretofore-known wheels residing in the arrangement of a center-body to cooperate with separately-made adjunctive parts such as hub and brake drum constructions.

While I have herein shown, for greater simplicity, several modifications embodying features of my invention all based on a common illustrative factor of dimension and general wheel design, it will be understood that this convenient simplification of the showing is not intended to limit my invention and that many changes in design and ing details of construction may be made without departure from the spirit of my invention within the scope of the appended claims.

I claim:

1. A metal wheel comprising in a unitary structure spokes and a center-body, said center-body having an open-centered disk portion and a strengthening portion projecting laterally inwardly from the disk portion and means for securing said strengthening portion to the hub of the wheel.

2. A metal wheel comprising in a unitary structure spokes and a center-body, said center-body having an open-centered disk portion and a strengthening portion projecting laterally inwardly from the disk portion, and means for securing a vehicle brake drum structure to said strengthening portion.

3. A metal wheel comprising in a unitary structure spokes and a center-body, said center-body having an open-centered disk portion and a strengthening portion projecting laterally inwardly from the disk portion, and means for securing a separate hub and brake drum of said wheel to the strengthening portion of said unitary structure.

4. A metal wheel comprising in a unitary structure spokes and a center-body, said center-body having an open-centered disk portion and a strengthening portion projecting laterally inwardly from the disk portion, and means for jointly securing to said strengthening portion of the unitary structure the hub and brake drum of said wheel.

5. In a forged wheel, a unitary structure comprising spokes and a center-body into which the roots of said spokes merge, said center-body providing a disk portion, a collar portion, and laterally projecting strengthening posts on the disk portion terminating at the inner plane of the center-structure.

6. In a forged wheel, a unitary structure comprising spokes and a center-body into which the roots of said spokes merge, said center-body providing a disk portion, a collar portion, and an inwardly projecting flange on the disk structure terminating at the inner plane of the center-structure.

7. A forged structural unit for wheels, comprising radial spokes and a center-body into which the roots of said spokes merge, said center-body comprising an open collar and a disk portion extending from said collar and, within the confines of said disk portion an annular laterally projecting strengthening structure.

8. A forged structural unit for wheels, comprising radial spokes and a center-body into which the roots of said spokes merge, said center-body comprising an open collar and a disk portion extending from said collar and, within the confines of said disk portion an annular laterally projecting flange having strengthening-post enlargements apertured for the reception of adjunct-attaching means.

CHAS. E. WADE.